(12) United States Patent
Sandys et al.

(10) Patent No.: US 7,873,949 B2
(45) Date of Patent: Jan. 18, 2011

(54) IN SOURCE CODE SUPPRESSION OF BINARY ANALYSIS

(75) Inventors: Sean David Sandys, Seattle, WA (US); Jeffrey van Gogh, Redmond, WA (US); Michael C. Fanning, Redmond, WA (US); Nicholas P. Guerrera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1225 days.

(21) Appl. No.: 11/349,577

(22) Filed: Feb. 8, 2006

(65) Prior Publication Data

US 2007/0226690 A1 Sep. 27, 2007

(51) Int. Cl.
G06F 9/45 (2006.01)

(52) U.S. Cl. .................................... 717/143

(58) Field of Classification Search ............. 717/126, 717/142, 130, 131, 143, 140, 106, 100, 124, 717/158, 127; 714/38, 711, 4, 56; 709/224
See application file for complete search history.

(56) References Cited

U.S. PATENT DOCUMENTS

| | | | | |
|---|---|---|---|---|
| 5,790,778 A | * | 8/1998 | Bush et al. ............... | 714/38 |
| 5,860,011 A | * | 1/1999 | Kolawa et al. ............ | 717/142 |
| 6,654,953 B1 | * | 11/2003 | Beaumont et al. ......... | 717/158 |
| 6,701,518 B1 | * | 3/2004 | Dwyer et al. .............. | 717/126 |
| 6,978,443 B2 | * | 12/2005 | Flanagan et al. .......... | 717/127 |
| 7,340,726 B1 | * | 3/2008 | Chelf et al. ............... | 717/126 |
| 2004/0261055 A1 | * | 12/2004 | Bertelrud et al. .......... | 717/106 |

OTHER PUBLICATIONS

"*Appendix E Control Comments*," LCLint User's Guide, May 2000, University of Virginia, Department of Computer Science, available at http://lclint.cs.virginia.edu/guide/appE.html (PDF enclosed entitled Article 1, 3 pages).
"*C/C++ Preprocessor Reference, warning*," Visual Studio 2005, MSDN Microsoft Library, available at http://msdn.microsoft.com/library/default.asp?url=/library/en-us/vclang/html/_predir_warning.asp (PDF enclosed entitled Article 2, 2 pages).

* cited by examiner

*Primary Examiner*—Tuan Anh Vu
(74) *Attorney, Agent, or Firm*—Workman Nydegger

(57) ABSTRACT

Upon accessing binary that was generated by a compiler using corresponding source code, a potential reportable problem in the binary is identified. The binary includes a compiler transformed indication that the potential reportable problem is to be suppressed at least under some circumstances. The transformed indication is generated by the compiler using a corresponding untransformed indication in the corresponding source code. The transformed indication is then used to decide that the potential reportable problem should not be reported. Thus, artifacts within the source code itself may ultimately direct what problems are not to be reported on when the corresponding binary is analyzed after the compile phase.

16 Claims, 4 Drawing Sheets

IN SOURCE CODE SUPPRESSION OF BINARY ANALYSIS

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing systems may be small enough to fit in the palm of the hand, while others are spread over much of the globe.

Regardless of their physical form, computing systems are composed of hardware and software. The hardware includes most fundamentally at least one processor and memory. The software includes instructions that may be embodied in the memory or in storage, and that can be accessed and executed by the processor(s) to direct the overall functionality of the computing system. Thus, software is critical in enabling and directing the functionality of the computing system.

Often, in order to construct software, a human being programmer first writes code that conforms to a programming language that contains syntax and semantics that are human readable, at least for a human who is familiar with the programming language. Such code is referred to as "source code". While the source code may be interpreted by a programmer that is properly educated on the programming language followed by the source code, the source code is not directly understood by the processors of the computing system. Instead, the source code must be transformed into computer-executable instructions that are directly executable by the processors in a manner that the execution causes the processor(s) to direct the functionality specified in the source code.

This transformation is often accomplished at least in part by a compiler. Sometimes the compiler performs full transformation of the source code to the computer-executable instructions. In that case, the compiler receives the source code and outputs computer-executable instructions that are directly leveraged by other programs and/or are readable by the processor(s) of a computing system. Alternatively or in addition, the compiler might only perform partial transformation of the source code. Specifically, the compiler receives the source code and outputs an equivalent code that is in an intermediate state. The intermediate state output code is neither source code nor is it directly leveraged by other programs and/or is not machine-readable. Accordingly, the intermediate code must go through-one or more further transformations in order to become directly leveraged by other programs and/or to become machine-level instructions. Regardless of whether the compiler performs full transformation or partial transformation of the source code, the output of the compiler is often referred to as "binary".

As the hardware and networking capabilities of the computing system have increased, so has the complexity of the software that drives the functionality of such powerful computing systems. The drafting of such complex software can be a significant challenge to programmers. Complex software can involve many thousands of lines of source code, and may require the services of large teams of programmers. Even so, the slightest mistake in the source code may adversely affect the functionality of the resulting binary. It is the role of the compiler to find those mistakes that are violations of the syntax rules of the corresponding programming language. The programmer may then make appropriate corrections to the source code and re-compile. Ultimately, the compiler generates binary.

Although the binary has successfully compiled, this does not mean the binary conforms to a desirable set of programming standards. In order to verify whether or not binary conforms to such programming standards, a binary analysis tool is often employed. Such an analysis tool reviews the structure of the binary and compares that structure against a structure that might be expected if the source code had conformed to a desired set of programming rules. If there is a violation of a rule, that violation is reported to the programmer. However, despite the complexity of such binary analysis tools, an experienced human programmer is still very often in the better position to make the ultimate judgment on whether or not the violation of the rule is truly an issue that needs redress. After all, the role of the binary analysis tool is to find structures in the binaries that are likely to be a problem.

There are many instances in which such structures will not be a problem at all depending on context that is known to the human programmer. For instance, perhaps a rule enforces a naming convention for a class library that was applicable to version one of software release such that the names of each of the classes conform to the expected class names for that version. Now suppose that the programmer is extending the class library in the next version of a software release. As the programmer introduces new class definitions, those names may no longer conform to the prior expected names for the prior version. Accordingly, a report message may be generated by the binary analysis tool even though the source code is proper as-is.

However, whenever subsequent iterations of the binary are analyzed, the report message will be repeated each time the binary is analyzed. There are several conventional ways to deal with a report message that has already been evaluated as requiring no action. One way is just to keep track of which report messages should be ignored for subsequent evaluations of the binary. However, such report messages may accumulate over time as more and more report messages are determined to require no action. This can become difficult for the programmer to identify which report messages are relevant, and which are not, and imposes a requirement of the programmer to mentally filter through the report thereby taxing the mental thought of the programmer at a time when the programmer could be focused on more important programming tasks.

Another conventional method for resolving this problem is to have a separate filtering tool that lists all of the report messages that should be ignored. When the analysis tool generates a list of report messages, that report message list is compared against the report messages that should be ignored. The filtering, tool then only allows the report messages that should not be ignored to be passed to the user. Unfortunately, the filtering comparison does not always work as intended. For instance, suppose that the analysis tool generates a report for a particular method, and that report is added to the filter list. Now suppose the programmer changes the name of the method. The filter may no longer match subsequent reports for the method against the filter list, thereby allowing the irrelevant report to pass to the programmer thereby perhaps causing the programmer to take time to review or even evaluate the report message.

BRIEF SUMMARY

The principles of the present invention relate to the analysis of binary generated by a compiler. Upon accessing binary that was generated by a compiler using corresponding source code, a potential reportable problem in the binary is identified. The binary includes a compiler transformed indication that the potential reportable problem is to be suppressed at least under some circumstances. The transformed indication is generated by the compiler using a corresponding untransformed indication in the corresponding source code. The transformed indication is then used to decide that the potential reportable problem should not be reported. Thus, artifacts within the source code itself may ultimately direct what problems are not to be reported when the corresponding binary is analyzed after compilation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention extend to the analysis of binary for potential reportable problems, and the selective suppression of problem reports based on transformed suppression indications in the binary, where the transformed suppression indications were transformed by the compiler based on untransformed suppression indications in the corresponding source code. First, an example computing system in which features of the present invention may operate will be described with respect to FIG. 1. Then, embodiments of the present invention will be described in further detail with respect to FIG. 2 and subsequent drawings.

Figure 1:
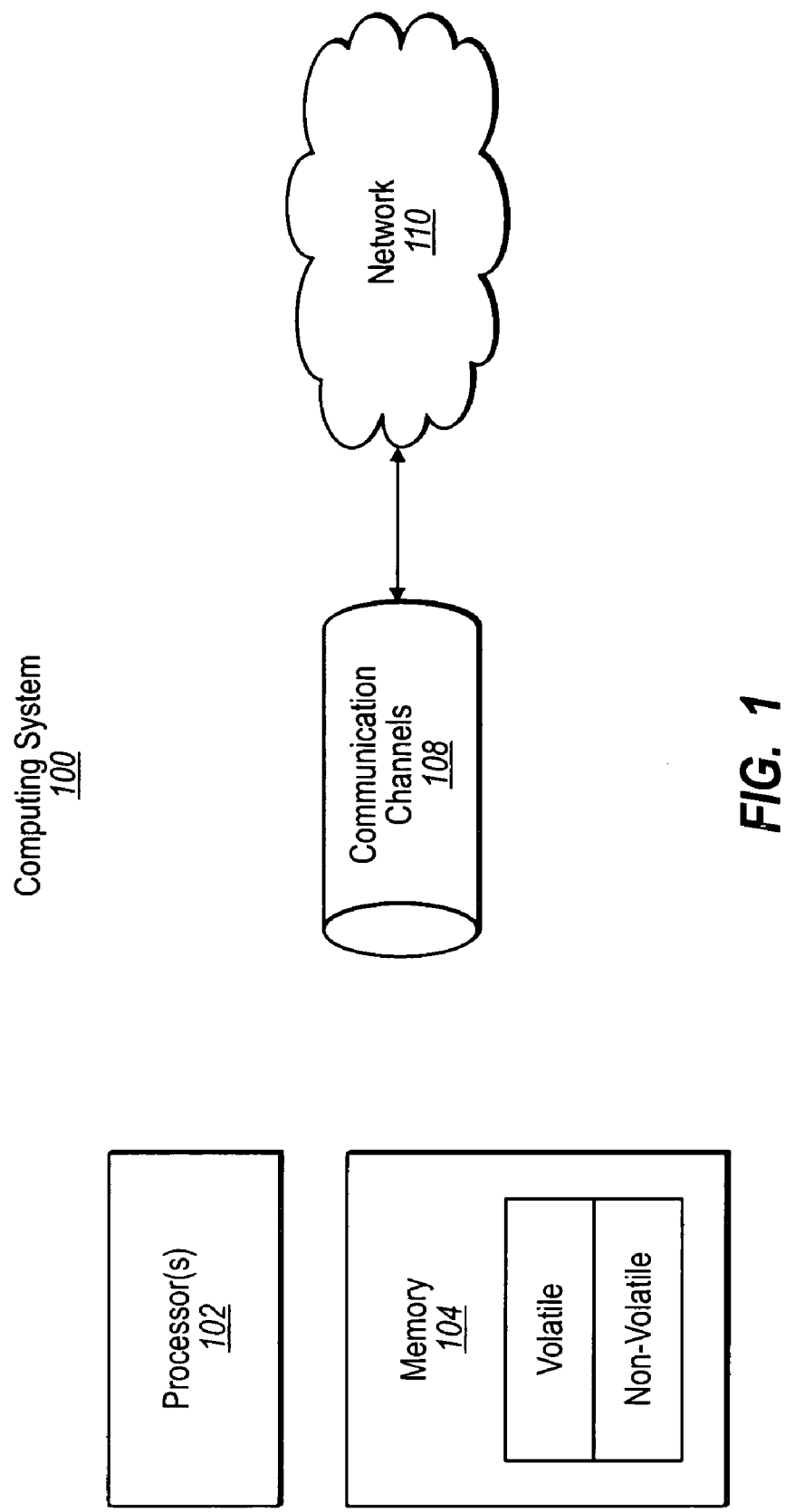
FIG. 1 schematically illustrates a suitable computing environment that may implement features of the present invention.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include. (but is not limited to), PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
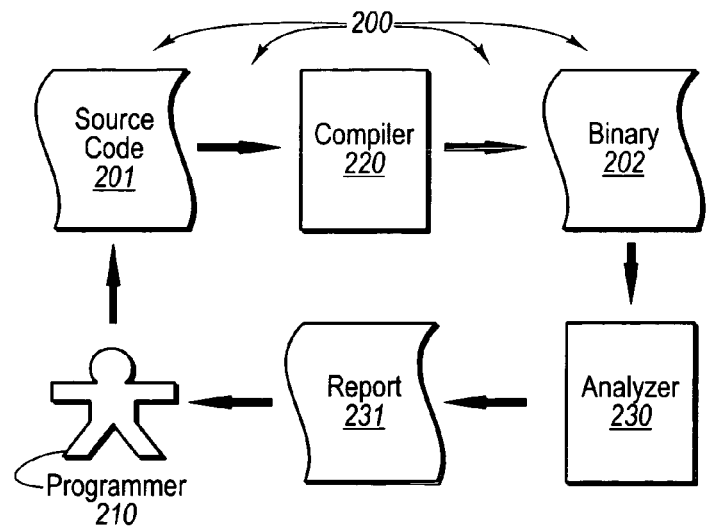
FIG. 2 illustrates a conventional schematic flow of program code from the initial source code stage to the binary analysis phase.

FIG. 2 illustrates a conventional schematic flow 200 of program code from the initial source code stage to the binary analysis phase. The process begins with source code 201. Source code 201 is simply text that is drafted by a computer programmer 210. A compiler 220 receives the source code 201. If the source code 201 conforms to the syntax and semantics of the programming language enforced by the compiler 220, the compiler 210 generates corresponding binary 202. In this description and in the claims, "binary" is defined as any code that is output by a compiler, regardless whether the binary is directly executable by a processor, or requires one or more further transformations (e.g., through one or more subsequent interpreters and/or compilers). In this description and in the claims, a "compiler" is any hardware and/or software component that is capable of generating a transformed representation of at least some input source code.

The binary 202 is evaluated by an analyzer 230, which searches through patterns that are symptomatic of there being a violation of a design rule or some other reportable problem. If there is a problem, the analyzer 230 reports the problem using a report 231 to the computer programmer 210. The report 231 may display be displayed on the screen, and may typically be in human-readable form.

The computer programmer 210 may then evaluate the report 231, and decide whether or not to take action based on the report. If the computer programmer 210 decides that the report 231 warrants action, the computer programmer 210 may alter the source code 201 to address the problem. The altered source code is then recompiled (by the compiler 220) and reanalyzed (by the analyzer 230) as desired until the associated binary is in acceptable form. Thus, the report 231 is helpful in allowing the computer programmer 210 to author a functional program. The report 231 may also be used for other purposes such as, for example, altering tool settings.

Figure 3A:
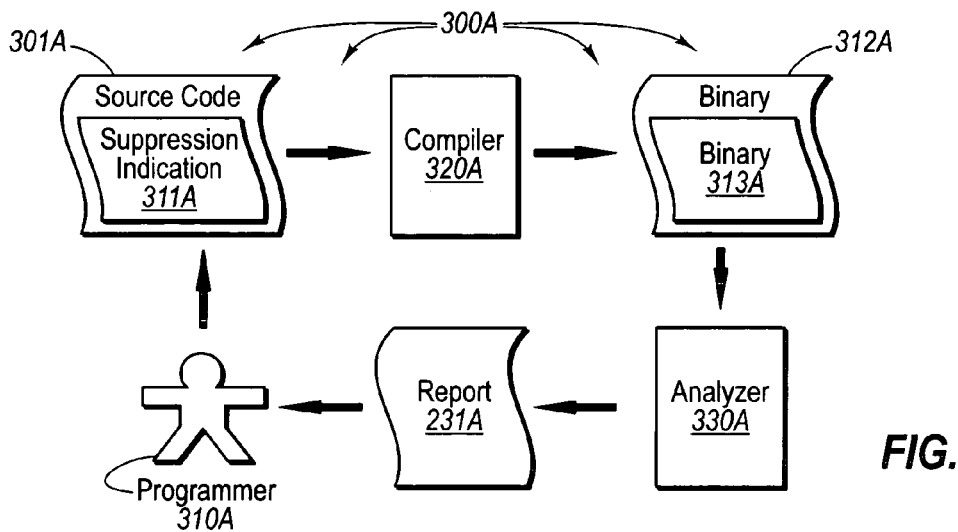
FIG. 3A illustrates a schematic flow of program code in accordance with one embodiment of the present invention in which the compiler generates a binary suppression representation integrated with the binary representation of the other source code.
Figure 3B:
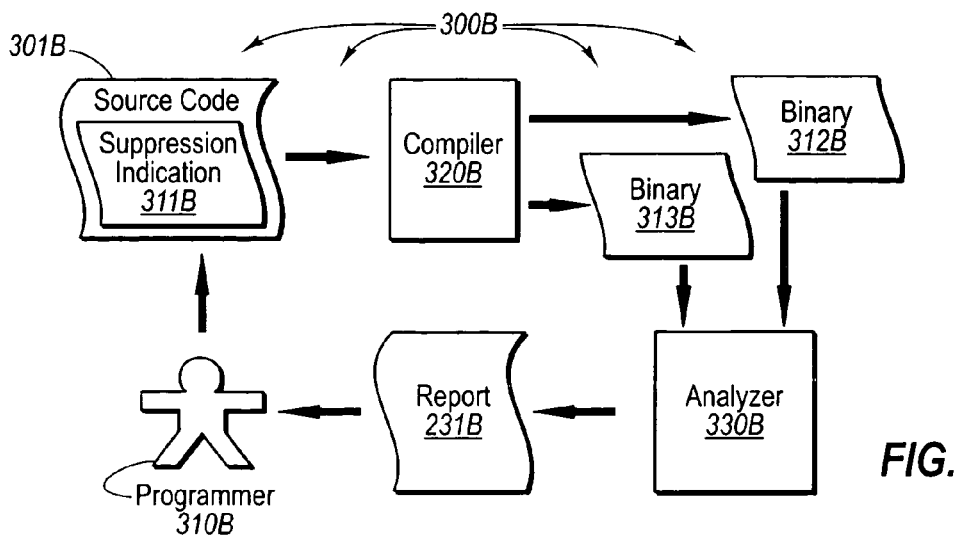
FIG. 3B illustrates a schematic flow of program code in accordance with another embodiment of the present invention in which the compiler generates a binary suppression representation that is different than the binary representation of the other source code.

FIGS. 3A and 3B schematically show the development process of program code in accordance with the principles of the present invention. In both embodiments 300A and 300B of respective FIGS. 3A and 3B, the analyzer evaluates suppression information within compiler-generated binary in order to determine if and/or how to suppress reports of potential problems with the binary. The compiler-generated suppression information is, in each case, generated by the compiler based upon corresponding suppression information provided in the source code. However, in the case of FIG. 3A, the suppression information and the rest of the binary corresponding to the functionality are integrated. In the case of FIG. 3B, the suppression information is in its own dedicated binary. In other cases not illustrated but represented by the combination of FIGS. 3A and 3B, some of the suppression information may be in its own dedicated binary, while some suppression information is integrated within the source code.

The process flow embodiments of FIGS. 3A and 3B will be described with references to FIG. 4, which illustrates a flowchart of a method 400 for analyzing binary generated by a compiler and selectively reporting regarding a potential problem with the analyzed binary depending on whether or not the analyzed binary contains an indication that the potential problem should be suppressed. Some of the acts are performed by a compiler, such as the compiler 320A or 320B of respective FIGS. 3A and 3B. Such acts are illustrated in the left column of FIG. 4 under the heading "Compiler". Other acts are performed by an analyzer, such as the analyzer 330A or 330B of respective FIGS. 3A and 3B. Such acts are illustrated in the right column of FIG. 4 under the heading "Analyzer".

Figure 4:
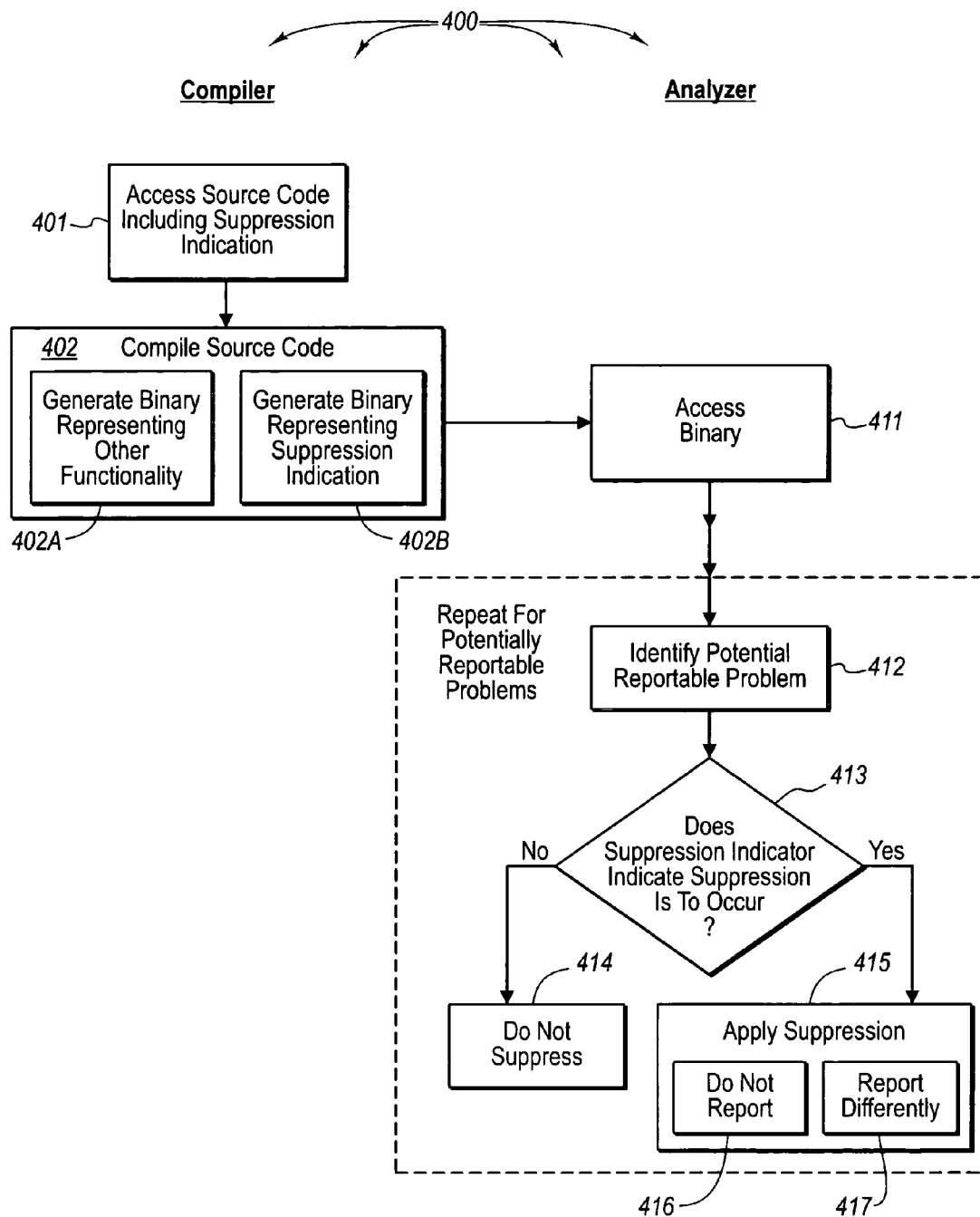
FIG. 4 illustrates a method for analyzing binary and selectively suppressing reports of potential reportable problems in accordance with the principles of the present invention.

Referring to FIG. 4, the compiler accesses source code that includes a suppression indication that a potential reportable problem to be detected is to be suppressed (act 401). For instance, in FIG. 3A, the compiler 320A accesses source code 301A, which includes a suppression indication 311A. In FIG. 3B, the compiler 320B accesses source code 301B, which includes a suppression indication 311B.

The suppression to be applied to the potential reportable problem may be complete suppression in which case the problem is not reported at all. The suppression may also be partial in which case perhaps the problem is reported in a manner that deemphasizes the problem. For example, the problem may be reported in smaller text, or text that has a different color, or perhaps in a different display window, or perhaps with some other indication that the problem has less significance or is not significant, such as a justification for ignoring the problem.

Figure 6:
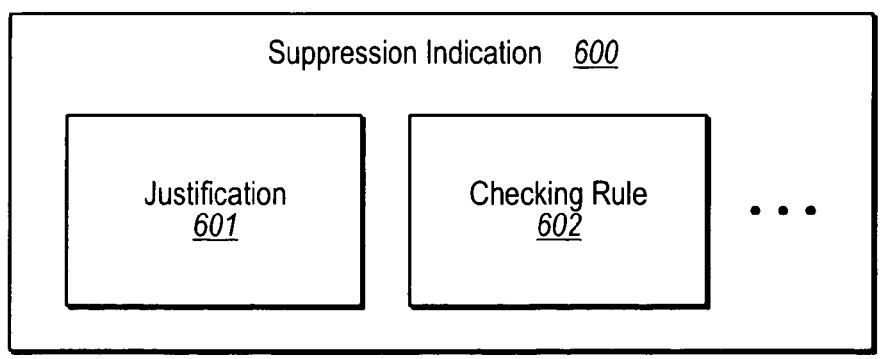
FIG. 6 schematically illustrates a suppression indication in accordance with the principles of the present invention.

FIG. 6 illustrates the suppression indication 600 that includes a representation of a justification 601 for ignoring the potential reportable problem and/or a representation of a checking rule 602 to which the potential reportable problem relates. The suppression indication 600 is an example of the suppression indication 311A and 311B of respective FIGS. 3A and 3B.

In one embodiment, the suppression indication is in the form of a suppression attribute in the source code. Programming languages that support the inclusion of attributes that survive the compiling process include any NET framework languages. The JAVA programming language may also include an attribute (at least under a broad interpretation of the term "attribute") or some other mechanism that might permit for the inclusion of a suppression indication consistent with the principles of the present invention.

Specific languages that support conditional attributes include C# and Visual Basic. Such conditional attributes may be specified to conditionally survive the compiling process. The use of the suppression attribute in a conditional attribute may be helpful since a developer may want the suppression attribute to survive in some cases, but not in others. For example, while it may be desirable to have the suppression attribute survive while the software is still under development and testing, it might not be desirable to have such suppression information in the binary that is ultimately shipped to the public. The inclusion of such suppression information in the released version of the software may adversely affect performance by unnecessarily consuming processing, memory, network, and/or storage resources.

As an example, the following suppression attribute may be applied to any target in the source code that the corresponding programming language permits to have attributes:

[SuppressMessage("Usage", "CA 1000:DoNotCallProblematicMethods")]

The [SuppressAttribute] attribute may have the following properties: "Category" which is a string that specifies the category that the rule to be suppressed lives in, "CheckId" which is a string that specifies an identifier for the rule and which is represented in FIG. 6 as element 602, "Target" which is a string that specifies the target on which the report is being suppressed, "Justification" which is a string that expresses the justification for suppressing the report and which is represented in FIG. 6 as element 601, "Scope" which is a string that specifies the kind of target that is hoped to be suppressed, and "MessageId" which is a string that specifies an additional identifier to disambiguate multiple messages of the same type of target.

For instance, in the example above, the "Usage" string is the category that the rule to be suppressed lives in. In this case, one of the usage rules is to be suppressed. The "CA1000" string is a string that specifies the short name for the rule to be suppressed against the target. In this case, however, both the short name and the corresponding long name "DoNoCallProblematicMethods" are specified. The target is not specified since in this example the target is implied by the position of the attribute in the source code.

There may be instances, however, in which the target to which suppression of a rule is to be applied does not allow attributes. For instance, a namespace may not allow attributes. In that case, the target may be specified in the attribute, such that the attribute may be placed in a location within the source code that does not necessarily imply the target of the suppression. For instance, consider the following example:

[module: SuppressMessage("Naming", "CA1004:AvoidMisspelledNamespaces", Scope="namespace", Target="company.foo", MessageId="foo"]

In this case, the category is "Naming" indicating that the rule to be suppressed is one of the naming rules. "CA1004" is the rule identifier corresponding to the checks for correct spelling of namespaces. The target of the check to be suppressed is the namespaces within company.foo and that have the message identifier of "foo".

Referring back to FIG. 4, after and/or while accessing the source code (act 401), the compiler then compiles the source code (act 402) by generating binary representing a transformed representation of the suppression indication (act 402B) and other binary representing the other functionality of the source code (act 402A). For instance, in FIG. 3A, the compiler 320A generates binary 313A representing a transformed version of the suppression indication using the original untransformed suppression indication 311A, and binary 312A that represents the other functionality of the source code. In the case of FIG. 3A, the suppression binary 313A is included within the other binary 312A representing the other functionality of the source code. In FIG. 3B, the compiler 320B generates suppression binary 313B (using the suppression indication 311B) and the other binary 312B that represents the other functionality of the source code. In the case of FIG. 3B, the suppression binary 313B and the other binary 312B are not integrated in the same binary and may even be in a different binary file.

The analyzer then accesses the binary from the compiler (act 411). For instance, in FIG. 3A, the analyzer 330A accesses binary 312A (and by implication binary 313A since it is integrated within binary 312A). In FIG. 3B, the analyzer 330B accesses binary 312B and 313B. Then acts 412 through act 415 may be repeated for one or more of the reportable problems detected. Acts 412 through 415 will be described further below.

Figure 5:
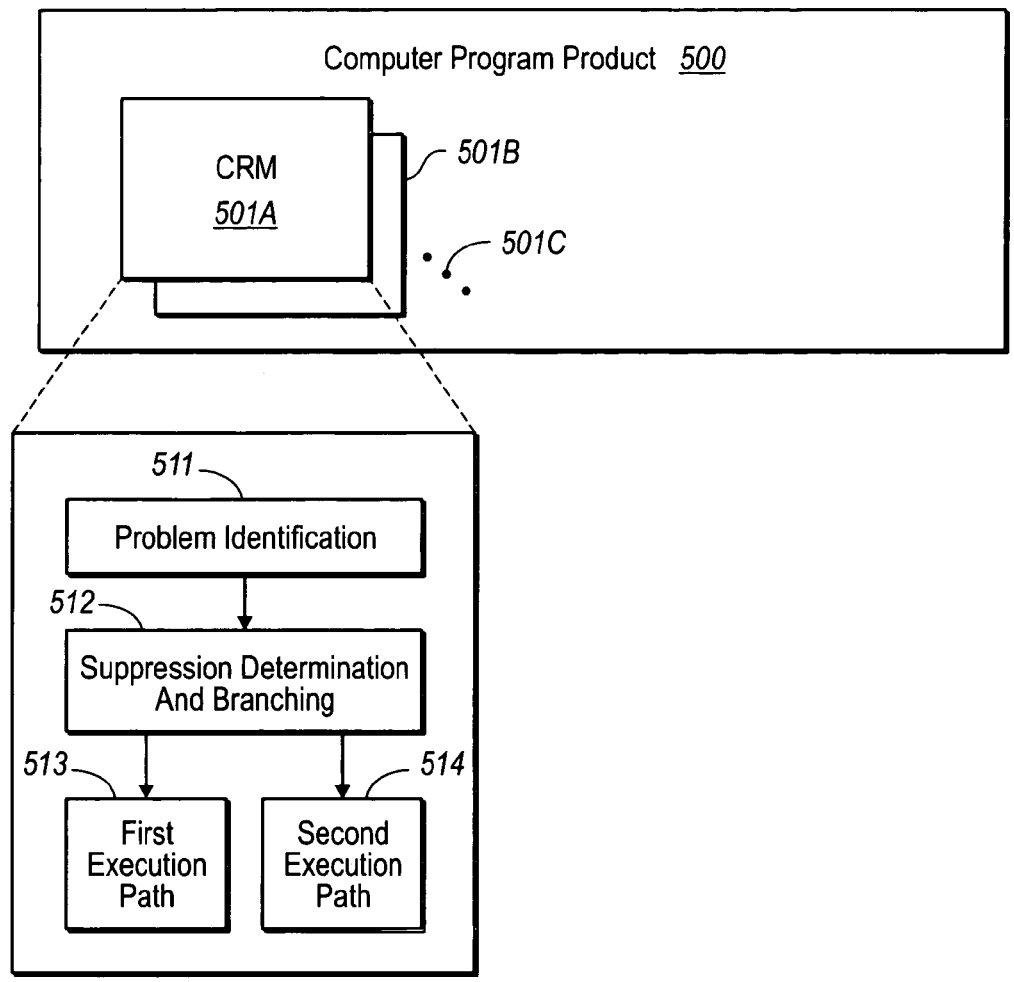
FIG. 5 illustrates a computer program product containing computer executable instructions capable of implementing the method of FIG. 4.

FIG. 5 illustrates a computer program product 500 that contains one or more computer readable media. In the example of FIG. 5, the computer program product 500 is illustrated as containing two computer-readable media 501A and 501B. However, the computer program product may include one or additional computer-readable media as represented by the ellipses 501C. Examples of computer readable media include physical storage media and/or system memory. The computer-readable media has thereon computer-executable instructions that, when executed by one or more processors of a computing system, cause the computing system to perform the analyzing of FIG. 4. For instance, if the computing system 100 includes the computer program product 500, the computing system 100 may perform the analyzing of FIG. 4 in response to the execution of computer-executable instruction on the computer program product 500.

For instance, the analyzer may identify the potential reportable problem is in the binary 312A or 312B (act 412). When performed using software, the problem identification computer-executable instruction(s) may direct this identification. The analyzer may specifically check the binary using a number of checking rules. Referring to FIG. 5, this may be performed using the problem identification module 511 if implemented in software.

The analyzer then determines whether the associated binary 313A and 313B contains a compiler-transformed indication that the potential reportable problem is to be suppressed at least under some circumstances (decision block 413). Referring to FIG. 5, this may be performed using the suppression determination and branching computer-executable instruction(s) 512 if implemented in software.

If there is no suppression indication for a particular potential reportable problem (No in decision block 413), then the analyzer may report the problem as usual without suppressing the report (act 414). If implemented in software, this may be accomplished using the first execution path 513 that is branched using the branching instruction(s) 512. However, if there is a suppression indication for a particular potential reportable problem (Yes in decision block 413), then suppression is applied to the potentially reportable problem (act 415). If implemented in software, this may be accomplished using the second execution path 514 that is branched using the branching instruction(s) 512.

One example of suppression is to use the transformed suppression indication to decide that the potential reportable problem should not be reported (act 416). As a less extreme form of suppression, the transformed suppression indication may be used to decide that the problem should be reported in a different manner (act 417). For instance, the analyzer may report the justification for suppression along with the problem report and/or may report regarding the checking rule and target that is being suppressed.

Thus, the principles of the present invention provide a mechanism for suppressing reports of potential problems resulting from analysis of binary. Since the suppression indication is originally in the source code and survives through the compiling process, the suppression may be enforced by the analyzer. Furthermore, subtle changes in the source code (such as a name change of the target of the suppression) do not necessarily affect the suppression.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for analyzing compiled binary code generated by a compiler and suppressing the reporting of a potential reportable problem with the analyzed binary because of the presence of one or more attributes in the compiled binary code that were originally included in the source code and maintained through compilation of the source code that specify that the potential reportable problem is to be suppressed, the method comprising the following:

an act of receiving source code that includes one or more attributes associated with a component of the source code that specify that a potential reportable problem in compiled binary code that implements the component is to be suppressed during subsequent analysis of the compiled binary code generated from the source code;

an act of compiling with a compiler the source code into the compiled binary code, wherein the one or more attributes are maintained in the compiled binary code rather than being removed during the compilation of the source code such that the association between the one or more attributes and the component remain in the compiled binary code;

an act of performing an analysis of the compiled binary code after the compilation of the source code that generated the compiled binary code, including:

an act of accessing the compiled binary code with a binary analysis tool;

an act of the binary analysis tool identifying a potential reportable problem in a portion of the compiled binary code that implements the component;

an act of the binary analysis tool determining that the portion of the compiled binary code that implements the component is associated with the one or more attributes that are also included in the compiled binary code; and an act of binary analysis tool accessing the one or more attributes to determine that the potential reportable problem in the portion of the compiled binary code that implements the component is to be suppressed such that the potential reportable problem is not displayed to a user of the binary analysis tool.

2. A method in accordance with claim 1, wherein the potential reportable problem is a first potential reportable problem, the method further comprising:

an act of identifying a second potential reportable problem in a portion of the compiled binary code that implements a different component;

an act of determining that the portion of the compiled binary code that implements the different component does not have an attribute associated with it that specifies that the second potential reportable problem is to be suppressed; and an act of reporting the second potential reportable problem.

3. A method in accordance with claim 1, wherein the compiled binary code is divided into two separate files, and wherein one of the separate files contains the one or more attributes whereas the other file contains the portion of the compiled binary code that implements the component and that includes the potential reportable problem.

4. A method in accordance with claim 1, wherein the one or more attributes also includes a representation of a justification for ignoring the potential reportable problem.

5. A method in accordance with claim 1, wherein the one or more attributes includes a representation of a checking rule to which the potential reportable problem relates.

6. A method in accordance with claim 5, further comprising an act of reporting the checking rule.

7. A method in accordance with claim 1, wherein the compiled binary code is capable of being executed by the .NET framework.

8. A method in accordance with claim 1, wherein the component is a namespace such that the one or more attributes specify that all potential reportable problems in the compiled binary code that implements components that are part of the namespace are to be suppressed.

9. A computer program product comprising one or more computer storage media storing computer executable instructions which when executed by a processor perform a method for analyzing compiled binary code generated by a compiler and suppressing the reporting of a potential reportable problem with the analyzed binary because of the presence of one or more attributes in the compiled binary code that were originally included in the source code and maintained through compilation of the source code that specify that the potential reportable problem is to be suppressed, the method comprising the following:

an act of receiving source code that includes one or more attributes associated with a component of the source code that specify that a potential reportable problem in compiled binary code that implements the component is to be suppressed during subsequent analysis of the compiled binary code generated from the source code;

an act of compiling with a compiler the source code into the compiled binary code, wherein the one or more attributes are maintained in the compiled binary code rather than being removed during the compilation of the source code such that the association between the one or more attributes and the component remain in the compiled binary code;

an act of performing an analysis of the compiled binary code after the compilation of the source code that generated the compiled binary code, including:

an act of accessing the compiled binary code with a binary analysis tool;

an act of the binary analysis tool identifying a potential reportable problem in a portion of the compiled binary code that implements the component;

an act of the binary analysis tool determining that the portion of the compiled binary code that implements the component is associated with the one or more attributes that are also included in the compiled binary code; and an act of binary analysis tool accessing the one or more attributes to determine that the potential reportable problem in the portion of the compiled binary code that implements the component is to be suppressed such that the potential reportable problem is not displayed to a user of the binary analysis tool.

10. The computer program product of claim 9, wherein the potential reportable problem is a first potential reportable problem, the method further comprising:

an act of identifying a second potential reportable problem in a portion of the compiled binary code that implements a different component;

an act of determining that the portion of the compiled binary code that implements the different component does not have an attribute associated with it that specifies that the second potential reportable problem is to be suppressed; and an act of reporting the second potential reportable problem.

11. The computer program product of claim 9, wherein the compiled binary code is divided into two separate files, and wherein one of the separate files contains the one or more attributes whereas the other file contains the portion of the compiled binary code that implements the component and that includes the potential reportable problem.

12. The computer program product of claim 9, wherein the one or more attributes also include a representation of a justification for ignoring the potential reportable problem.

13. The computer program product of claim 9, wherein the one or more attributes include a representation of a checking rule to which the potential reportable problem relates.

14. The computer program product of claim 13, wherein the method performed by the execution of the computer executable instructions further comprises an act of reporting the checking rule.

15. The computer program product of claim 9, wherein the compiled binary code is capable of being executed by the .NET framework.

16. The computer program product of claim 9, wherein the component is a namespace such that the one or more attributes specify that all potential reportable problems in the compiled binary code that implements components that are part of the namespace are to be suppressed.

* * * * *